United States Patent [19]

Yoshida

[11] Patent Number: 4,468,207
[45] Date of Patent: Aug. 28, 1984

[54] SYSTEM FOR REDUCING VIBRATION IN A VEHICLE PROVIDED WITH AN INTERNAL COMBUSTION ENGINE

[75] Inventor: Akio Yoshida, Toyota, Japan

[73] Assignee: Toyota Jidosha Kogyo Kabushiki Kaisha, Toyota, Japan

[21] Appl. No.: 45,940

[22] Filed: Jun. 6, 1979

[30] Foreign Application Priority Data

Mar. 30, 1979 [JP] Japan ................................ 54-37918

[51] Int. Cl.³ ............................................. F16D 3/14
[52] U.S. Cl. ....................................... 464/65; 464/81;
   464/180; 74/574; 192/106.2
[58] Field of Search ................... 64/27 C, 27 F, 1 V,
   64/27 R, 15 C; 74/574, 572; 192/106.1, 106.2;
   464/65, 66, 81, 180

[56] References Cited

U.S. PATENT DOCUMENTS

| 3,056,312 | 10/1962 | Timpner et al. ............... | 74/574 |
| 3,223,214 | 12/1965 | Kuivinen ........................ | 64/27 F |
| 4,002,043 | 1/1977 | Yoshida ......................... | 64/27 C |
| 4,018,320 | 4/1977 | Schrape et al. ................ | 64/27 C |
| 4,177,888 | 12/1979 | Arrowsmith .................. | 64/27 C |

OTHER PUBLICATIONS

Timoshenko, Vibration Problems in Engineering, 1/1955, pp. 9 through 13.

*Primary Examiner*—Magdalen Y. C. Moy
*Attorney, Agent, or Firm*—Kenyon & Kenyon

[57] ABSTRACT

A vibration damping system in a vehicle is provided with an internal combustion engine, the system being provided with a first flywheel connected to the engine and a second flywheel connected to a drive train mechanism of the vehicle. A damping apparatus, capable of generating an elastic force, as well as a frictional force, is arranged between the flywheels. The total moment of inertia of the portion of the system which is located on the drive side, including the engine and the first flywheel, is equal to the total the moment of inertia of the portion of the system which is located on the driven side, including the drive train mechanism and the second flywheel.

4 Claims, 4 Drawing Figures

1

SYSTEM FOR REDUCING VIBRATION IN A VEHICLE PROVIDED WITH AN INTERNAL COMBUSTION ENGINE

BACKGROUND OF THE INVENTION

This invention relates generally to systems for reducing vibration in vehicles, and more particularly to a system for reducing vibration caused by the fluctuation of the output torque of an internal combustion engine.

U.S. Pat. No. 4,002,043 discloses a system for reducing vibration in a vehicle provided with an internal combustion engine. The system decribed therein comprises a first flywheel connected to the engine, a second flywheel connected to a drive train mechanism and a damping apparatus arranged between the flywheels. The damping apparatus can generate a spring force as well as a frictional damping force. This system effectively reduces high frequency torsional compliance (i.e., ratio of the angular amplitude of the second flywheel to an amplitude of the fluctuating torque applied to the first flywheel from the crankshaft of the engine), without requiring an increase in the diameter of the flywheels. Thus, the fluctuating torque in the crankshaft is effectively absorbed, and the vibration in the drive train mechanism is effectively decreased.

In the above system, the sum of the moments of inertia of the first and second flywheels is maintained at a predetermined constant value, in order to minimize the diameter or weight of the flywheels. In addition the values of the moments of inertia of the flywheels should be determined so that a minimum of vibration is achieved.

It is, therefore, an object of the present invention to provide a vibration damping system arranged between two flywheels of a vehicle, for reducing vibration substantially to a minimum.

It is another object of the present invention to provide a vibration damping system which effectively decreases vibration in a vehicle by permitting an advantageous allocation of values of moments of inertia of the flywheels and associated vehicle components, wherein the sum of the values is maintained constant.

SUMMARY OF THE INVENTION

A system for operating a vehicle wheel mechanism in a vehicle which has an internal combustion engine provided with an output shaft; a drive train having one end adapted to be connected to the wheel mechanism for generation of a rotational motion thereof and a damping apparatus arranged between the output shaft and the drive train. The damping apparatus is comprised of first and second inert bodies which are, arranged on a common axis of rotation facing each other with a small gap therebetween. The first inert body is fixedly connected to the output shaft of the engine, and the second inert body is fixedly connected to the other end of the drive train away from the wheel mechanism. The sum of the moments of inertia of the first inert body and the second inert body is maintained at a constant value, and a damping means is arranged between the first inert body and the second inert body for generating an elastic force and a frictional force between the first and second inert bodies. The total value of the moments of inertia of the parts located on one side of the damping means, including the first inert body and the engine, is maintained equal to the total value of the moments of inertia of the parts located on the other side of the damping means, including the second inert body and the drive train.

DETAILED DESCRIPTION

Figure 1:
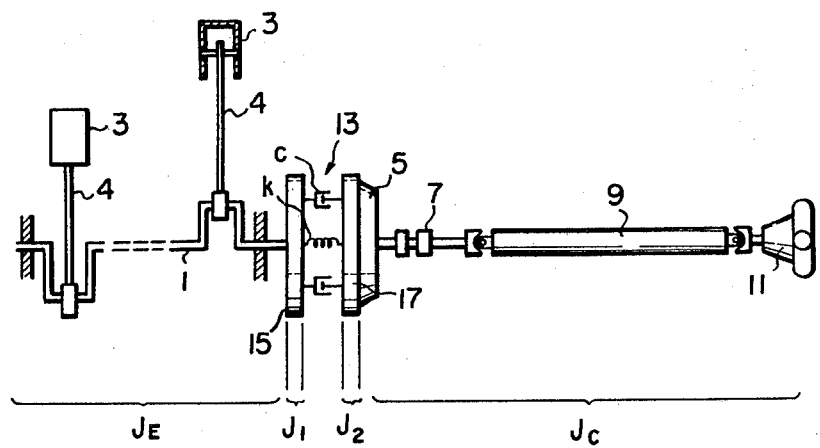
FIG. 1 is a diagrammatical view of a vehicle operating system provided with a damping apparatus according to the present invention.

FIG. 1 indicates schematically the main moving parts of a motor vehicle provided with an internal combustion engine. The engine is of a conventional multi-cylinder type which is provided with a crankshaft 1 and a plurality of pistons 3. Pistons 3 are connected to crankshaft 1 by a plurality of respective connecting rods 4. The vehicle also comprises a drive train including a clutch device 5, a transmission gear 7, a propeller shaft 9 and a differential mechanism 11. The differential mechanism 11 is connected to a wheel mechanism (not shown). Reference numeral 13 generally denotes an apparatus for reducing vibration in a vehicle according to the present invention. Vibration reducing apparatus 13 has a drive flywheel 15 and a driven flywheel 17. Flywheels 15 and 17 are arranged on a common axis of rotation with a small gap therebetween. A damping device is arranged between flywheels 15 and 17, which device includes a spring means having a spring coefficient "k", and a damping means having a damping coefficient "c".

Figure 2:
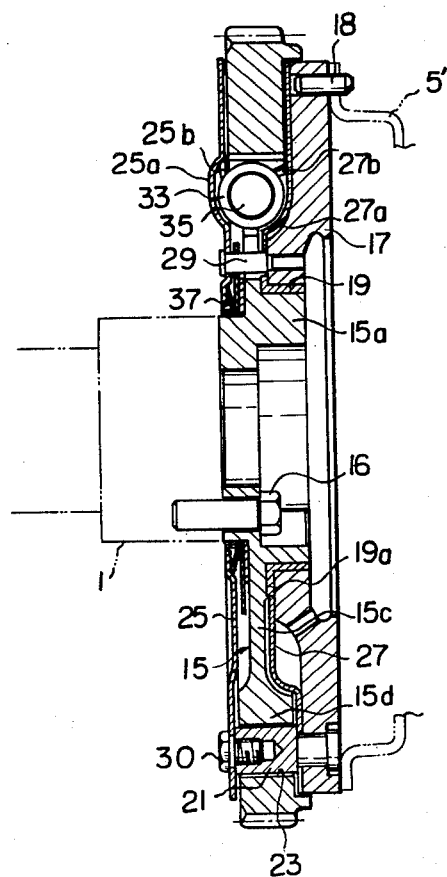
FIG. 2 is an axial cross-sectional view of an embodiment of the invention.
Figure 3:
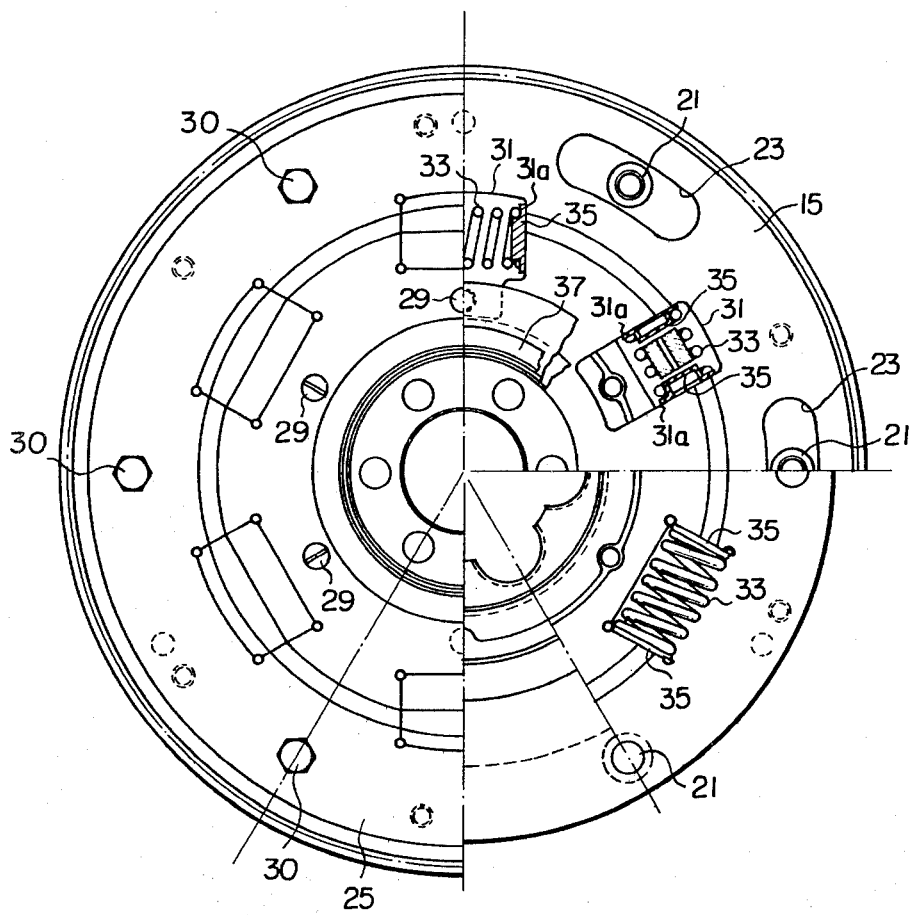
FIG. 3 is a front view of the embodiment shown in FIG. 2 as seen from the side of the engine.

Referring to FIGS. 2 and 3 which illustrate an embodiment of apparatus 13 according to the present invention, drive flywheel 15 has a hub portion 15a, to which an end of crankshaft 1 is fixedly connected by conventional means, such as bolts 16. Driven fly wheel 17 is rotatably mounted on hub portion 15a of drive flywheel 15, as will be fully described later. Driven flywheel 17 has at an outer periphery thereof a plurality of equiangularly spaced bores (not specifically identified), in each of which is disposed a respective one of a plurality of pins 18 for connecting flywheel 17 to an outer casing 5' of the clutch device 5, as generally illustrated in FIG. 1. In order to allow a relative rotational motion between flywheels 15 and 17, a flange-shaped bushing member 19 is fixedly inserted into the driven fly wheel 17. Bushing member 19 is rotatably fitted to hub portion 15a of flywheel 15. A plurality of equiangulary spaced stopper pins 21 are fixedly mounted to driven flywheel 17. Drive flywheel 15 has an outer peripheral portion 15d which contains a plurality of equiangulary spaced, arc-shaped slots 23. A stopper pin 21 is slidably inserted into each of slots 23. This arrangement of pins 21 and slots 23 permits only a predetermined amount of rotational movement between the flywheels 15 and 17.

A pair of axially disposed annular plates 25 and 27, made of relatively thin metal, are arranged in such a manner that drive fly wheel 15 is sandwiched between plates 25 and 27. Plates 25 and 27 are fixedly connected to flywheel 17 by means of a plurality of screw bolts 30, which are screwed into the respective stopper pins 21, and which project out of respective arc-shaped slots 23 of driven flywheel 17. Thus, the annular plates 25 and 27 can rotate together with driven flywheel 17. Plates 25 and 27 transmit the rotation from drive wheel 15 to the driven wheel 17, as will be fully described later.

The spring element having the spring coefficient "k" and the damping element having the damping coefficient "c", discussed above with respect to apparatus 13 of FIG. 1, constructed as described hereinbelow with respect to FIGS. 2 and 3. A plurality of equiangularly spaced openings 31 of substantially rectangular shape are formed in drive flywheel 17. A coil spring 33 is arranged in each of the openings 31 in such a manner that the opposite ends thereof engage respective spring seats 35, which are rested on circumferentially spaced inner edges 31a of each of the openings 31. Plate 25 has a plurality of equiangularly spaced recessed portions 25a which define edge portions 25b. Plate 27 has a plurality of equiangulary spaced recessed portions 27a facing respective ones of recessed portions 25a. Recessed portion 27a defines edge portions 27b. Each spring 33 is arranged in a respective pair of recessed portions 25a and 27 which face each other in such a manner that the ends of the spring 33 can engage the edge portions 25a and 25b. Therefore, drive flywheel 15 is connected to driven flywheel 17 by way of coil springs 33 which are shown in schematic form in FIG. 1 by a spring member having the spring constant "k". Relative rotation between flywheels 15 and 17 is thus allowed when coil springs 33 are deformed. A belleville, or disk, spring 37 is arranged inside of the end plate 25 for urging drive flywheel 15 away from plate 25, so that a flange portion 19a of bushing 19 contacts driven flywheel 17. Thus, a frictional force is generated between driven flywheel 17 and bushing 19 which is integral with drive flywheel 15. The frictional force has a damping coefficient "c", as schematically illustrated in FIG. 1.

The above-described system decreases vibration in a vehicle, since the damping apparatus of the present invention which is arranged between flywheels 15 and 17 can absorb the fluctuating torque present in the output torque produced by the internal combustion engine. This absorption of the fluctuating torque by the damping apparatus, which includes coil springs 33 for generating a spring force and bushing 19 for generating a frictional force, is effected under the general principle described in U.S. Pat. No. 4,002,043.

The present invention is directed to a particular arrangement of moments of inertia of the flywheels 15 and 17, which makes it possible to obtain a maximum vibration-decreasing effect. This arrangement of moments of inertia is derived from the following principles:

Firstly, it is assumed that the following equation is satisfield when the moment of inertia of drive flywheel 15 is $J_1$ and the moment of inertia of driven flywheel 17 is $J_2$:

$$J_1 + J_2 = \text{constant } (J_0) \quad (1)$$

This assumption is reasonable, since a maximum diameter, or weight, of flywheels 15 and 17 should be limited when flywheels 15 and 17 are mounted in a small space in the vehicle.

Figure 4:
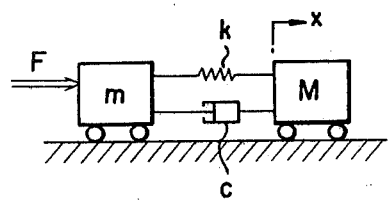
FIG. 4 is a schematic view of a linear vibration system equivalent to the rotation vibration system of the invention.

Secondly, the rotational reducing system of the present invention in FIG. 2 corresponds to a linear vibration-reducing system, as shown in FIG. 4, wherein a first member having a mass "m" and a second member having a mass of "M" are connected to each other via a damping device having a spring element with spring constant "k" and a damping element of a damping coefficient of "c". When a linear vibrational force F is applied to the first member having the mass "m" to produce a displacement x of the second member having the mass "M", the following relationship holds:

$$\frac{x}{F}(\omega) = \frac{k + jc\omega}{(k - M\omega^2 + jc\omega)(k - m\omega^2 + jc\omega) - (k + jc\omega)^2} \quad (2)$$

In the equation (2), "$\omega$" is frequency of the vibration.

In order to apply equation (2) which relates to the linear vibration system of FIG. 4, to the rotational vibration system of FIG. 1, it is necessary to replace masses "m" and "M" by the moment of inertia $J_1$ of drive flywheel 15 and the moment of inertia $J_2$ of driven flywheel 17, respectively; replace the force F(x) by the torque T($\omega$) applied to the drive flywheel 15; and, replace the displacement x by a value $\theta$ which corresponds to the amplitude of the angular vibration of driven flywheel 17. Thus, the following relationship is obtained:

$$\frac{\theta}{T}(\omega) = \frac{k + jc\omega}{\{k - (J_2 + Jc)\omega^2 + jc\omega\}\{k - (J_1 + JE)\omega^2 + jc\omega\} - (k + jc\omega)^2} \quad (3)$$

In equation (3), "Jc" is the total moment of inertia of the wheel drive train system comprised of clutch 5, transmission 7, propeller shaft 9 differential mechanism 11, etc.; and "JE" is the total moment of inertia of the engine system comprised of crankshaft 1 and pistons 3, etc. The reason Jc is added to $J_2$ is that the wheel drive train is directly connected to drive flywheel 17. The reason JE is added to J is that the engine is directly connected to drive flywheel 15.

From equation (3), the following equation is obtained:

$$\left|\frac{\theta}{T}(\omega)\right| = \frac{k}{\{k - (J_2 + Jc)\omega^2\}\{k - (J_1 + JE)\omega^2\}} \quad (4)$$

Equation (4) indicates a frequency response of a ratio of a torsional angle $\theta$ of flywheel 17 to a unit value of torque T applied to flywheel 15, i.e., so-called torsional vibration compliance. As the value of the torsional vibration compliance is decreased, the transmission of torque fluctuation from flywheel 15 to flywheel 17 is increasingly damped. Thus, in order to obtain a maximum damping effect, it is necessary to select values of the moments of inertia $J_1$ and $J_2$, so that the torsional vibration compliance determined by equation (4) becomes minimum. Since $J_2 = J_0 - J_1$, the following equation is obtained:

$$\left|\frac{\theta}{T}(\omega)\right| = \frac{k}{\{k - (J_0 - J_1 + Jc)\omega^2\}\{k - (J_1 + JE)\omega^2\}} \quad (5)$$

Equation (5) is differentiated with regard to $J_1$, so as to produce the relationship:

$$\frac{\delta}{\delta J_1} \left| \frac{\theta}{T}(\omega) \right| = \frac{-\omega^4(J_0 + Jc - JE - 2J_1)}{\{k - (J_0 - J_1 + Jc)\omega^2\}^2 \{k - (J_1 + JE)\omega^2\}^2} \quad (5)$$

When the torsional vibration compliance has a minimum value, equation (5) should be zero. Thus, the arrangement of the moment of inertia $J_1$ and $J_2$ of the flywheels 15 and 17 is determined by the following equations:

$$J_1 = \frac{J_0 + Jc - JE}{2} \quad (7)$$

$$J_2 = \frac{J_0 - Jc - JE}{2} \quad (7')$$

These equations, (7) and (7'), are equivalent to the following equation, since $J_1 + J_2 = J_0$:

$$J_1 + JE = J_2 + Jc \quad (8)$$

This equation means that the total moment of inertia of the parts located on one side of the damping apparatus, including the engine and flywheel 15, "$J_1 + JE$", should be equal to the total moment of inertia of the parts located on the other side of the damping apparatus, including flywheel 17 and the drive train mechanism, "$J_2 + Jc$". In this case, the tortional vibration compliance of the system in FIG. 1 has a minimum value, so that the vibration in the vehicle can be very effectively reduced.

Therefore, in the apparatus shown in FIGS. 2 and 3, drive flywheel 15 and driven flywheel 17 are constructed such that the values of moments $J_1$ and $J_2$ can satisfy the equations (7) and (7'), respectively.

EXAMPLE

In a vehicle having a Jc of 0.56 (kg·cm·S$^2$) and a JE of 0.41 (kg·cm·S$^2$), an effective vibration decreasing effect was obtained when $J_1$ was 0.7 (kg·cm·S$^2$) and $J_2$ was 0.5 (kg·cm·S$^2$). In this case, $JE + J_1 = 1.11$ while $Jc + J_2 = 1.06$. Thus, the requirement in the equation (8) is approximately satisfied.

In this example, the value $J_1$ of drive flywheel 15 is larger than the value $J_2$ of driven flywheel 17. However, from the point of view of actual design, the diameters of flywheels 15 and 17 should be nearly equal. Thus, in drive flywheel 15 in the embodiment shown in FIGS. 2 and 3, the middle portion 15c has a small thickness and the circumferential portion 15d has a large thickness. Accordingly, the moment of inertia $J_1$ of flywheel 15 can be larger than the moment of inertia $J_2$ of flywheel 17, even though the diameter of flywheel 15 is substantially equal to the diameter of flywheel 17.

While the present invention has been described with reference to a particular embodiment, it should be understood that modifications and changes can be made by those skilled in this art, without departing from the scope of the present invention.

What is claimed is:

1. A damping system for reducing the magnitude of vibration which is transmitted to a vehicle wheel mechanism, in a vehicle of the type having an internal combustion engine which is provided with an output shaft, and a drive train having a first end adapted to be connected to the wheel mechanism for producing a rotational motion of the wheel mechanism, the damping system being arranged between the output shaft and the drive train, the damping apparatus comprising:

first and second inert bodies arranged on a common axis of rotation and facing each other with a small gap therebetween, said first inert body being fixedly connected to the output shaft of the engine, said second inert body being fixedly connected to a second end of the drive train, said second end being disposed away from the wheel mechanism, a sum of values of the moments of inertia of said first and second inert bodies being maintained at a constant value, and;

damping means arranged between said first and second inert bodies for generating elastic and frictional forces between said first and second inert bodies, wherein a first total moment of inertia, on one side of the damping means, including said first inert body and the engine, is maintained substantially equal to a second total moment of inertia on the other side of the damping means, including said second inert body and the drive train.

2. The damping system according to claim 1, wherein said first inert body is provided with a central boss portion which is fixedly connected to the output shaft of the engine, an intermediate portion of a uniformly small thickness, and an outer peripheral portion of a large thickness, and said second inert body has a substantially ring shaped form, said second inert body being rotatable mounted on said boss portion of said first inert body, whereby a moment of inertia of said first inert body is greater than that of said second inert body.

3. The damping system according to claim 2, wherein said damping means comprises a plurality of spring means which are equiangularly arranged in said intermediate portion of said first inert body, said second inert body being provided with abuttment means for engaging each of said spring means, and a damping element having a flange-shaped sleeve member inserted on said boss portion of said first inert body, and an elastic member for urging said first inert body into contact with said flange portion of said sleeve member.

4. The damping system according to claim 3, wherein said abuttment means comprises a pair of spaced-apart thin plates fixedly connected to said second inert body, said first inert body being arranged between said pair of plates, said plates being angularly spaced-apart by stopper recesses, each said stopper recess defining a pair of circumferentially spaced-apart edge portions for engaging respective ends of each of, said spring means when an angular motion is effected between said first and second inert bodies.

* * * * *